United States Patent [19]
Kelly et al.

(10) Patent No.: US 7,349,699 B1
(45) Date of Patent: Mar. 25, 2008

(54) METHOD AND APPARATUS FOR TRANSMITTING TRAFFIC ON OVERLAY AND UNDERLAY CARRIERS

(75) Inventors: Owen Kelly, Ottawa (CA); Karl Mann, Nepean (CA); Miroslav Budic, Murphy, TX (US); Marthinus Da Silveira, Nepean (CA); Mikhail Royz, Nepean (CA); Bob Tapadar, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 273 days.

(21) Appl. No.: 10/915,384

(22) Filed: Aug. 11, 2004

(51) Int. Cl.
*H04Q 7/20* (2006.01)
(52) U.S. Cl. ............. 455/444; 455/443; 455/445; 455/446; 455/447
(58) Field of Classification Search ......... 455/444–449
See application file for complete search history.

(56) References Cited

U.S. PATENT DOCUMENTS

| | | | | |
|---|---|---|---|---|
| 5,355,515 A | * | 10/1994 | Sicher | 455/438 |
| 5,722,072 A | * | 2/1998 | Crichton et al. | 455/437 |
| 5,787,348 A | * | 7/1998 | Willey et al. | 455/441 |
| 6,212,382 B1 | * | 4/2001 | Watson et al. | 455/444 |
| 6,430,168 B1 | * | 8/2002 | Djurkovic et al. | 370/331 |
| 2002/0102976 A1 | * | 8/2002 | Newbury et al. | 455/436 |

* cited by examiner

Primary Examiner—Lester G. Kincaid
Assistant Examiner—Diego Herrera

(57) ABSTRACT

Overlay and underlay carriers are used to transmit traffic over a cellular network for a call associated with a mobile terminal. A method involves determining which one of the underlay carrier and the overlay carrier is to carry the traffic as a function of a resource parameter associated with a resource for transmitting the traffic and a mobility parameter of the mobile terminal. In some implementations, the method is applied at for example a base station to a plurality of calls associated with various mobile terminals within a cell and the calls are assigned to the underlay carrier and the overlay carrier using an optimization routine that optimizes a function associated with the capacity while imposing a constraint such as for example a constraint on a hand-off rate between the carriers.

28 Claims, 4 Drawing Sheets

METHOD AND APPARATUS FOR TRANSMITTING TRAFFIC ON OVERLAY AND UNDERLAY CARRIERS

FIELD OF THE INVENTION

The invention relates to a method and apparatus for transmitting traffic on overlay and underlay carriers.

BACKGROUND OF THE INVENTION

In cellular network networks, particularly wide band cellular networks, traffic for a cell may be carried at a first carrier frequency $f_1$ on a carrier referred to as an underlay carrier typically available in all the cells. In some cases a cell has one or more additional carriers referred to as overlay carriers over which the traffic can be transmitted at respective carrier frequencies. Such cells have overlay carrier capabilities might be used for example in "hot spots" where there is a high concentration of traffic, such as shopping centers and schools. The use of overlay carriers allows more calls to be accommodated resulting in an increase in capacity; however, the overlay carriers can be isolated in that neighboring cells do not necessarily make use of overlay carriers having the same carrier frequencies or may not use any overlay carriers at all. HHO (Hard Hand-Off) mechanisms are used for handing off calls assigned to overlay carriers when mobile terminals move from one cell to another cell that does not have the overlay carrier. HHOs can be risky in that calls can be dropped when a mobile terminal moves one cell to another. SHO (Soft Hand-Off) does not involve switching between carrier frequencies, and is a safer mechanism than HHO in terms of risk of call drop. Therefore, the increase in capacity due to the overlay carrier is accompanied by an increase in a call drop rate.

One approach referred to as a cell cluster approach has been used in which cells neighboring a central cell that covers a hot spot are also provided with overlay carrier capabilities to reduce the call drop rate for calls associated with mobile terminals exiting the central cell. However, deploying additional overlay carriers in neighboring cells is costly. Furthermore, in such systems, hardware used to implement the overlay carriers in the neighboring cells is under-utilized making such an approach inefficient.

Some solutions have been proposed for an isolated overlay carrier having a second carrier frequency $f_2$ in which there is no capability of transmitting traffic on the second carrier frequency $f_2$ for neighboring cells. In one solution, for each call a RTD (Round Trip delay) is measured, and which of the underlay carrier or the overlay carrier is used for the call depending on the RTD. In particular, if the RTD is greater than a threshold RTD the call is assigned to the underlay carrier and if the RTD is less than the threshold RTD the call is assigned to the overlay carrier. With such a method there can still be a large call drop rate if the threshold RTD is large. To reduce the called drop rate the RTD threshold must be reduced thereby reducing the area over which traffic can be transmitted on the overlay carrier. This results in ineffective use of the isolated overlay carrier.

RTD reports are only an approximate indicator of distance due to measurement error from various sources. Calls may also drop in an RTD-only based mechanism because the cell shape (as defined by the area in which the central cell provides adequate signal quality) may not be circular. Furthermore, at its best RTD is a measure of the distance that radio signals travel but this only corresponds to geographic distance if there is a line-of-sight signal path. An RTD-only solution does not account for load variations.

Another method used for isolated overlay carriers requires a deployment of a cluster of pilot beacons in neighboring cells. However, this requires additional hardware and is costly. Furthermore, this method may be intolerant to load variations. Neighbor cell pilot beacons involve transmitting from the neighbor cells a constant power-level on an overlay frequency. With such a construction, a mobile terminal on the central overlay can measure the signal strength of its own carrier in comparison to that of the neighboring cells. The ratio of signal strengths can be used as a trigger for hard hand-off. In addition, the measured pilot strength can assist the mobile terminal selecting a hard hand-off target as it leaves the overlay cell.

Single carrier systems will generally be able to perform soft hand-off. Multi-carrier systems generally have one or more carriers on which soft hand-off is always available, the so-called underlay carriers, and one or more carriers (the so-called overlay carriers) that may require hard hand-off in some instances, for example at the edge of a cluster of cells serviced by the overlay carrier.

SUMMARY OF THE INVENTION

Overlay and underlay carriers are used to transmit traffic over a cellular network for calls associated with mobile terminals. A method involves determining which one of the underlay carrier and the overlay carrier is to carry the traffic as a function of a resource parameter associated with a resource for transmitting the traffic and a mobility parameter of a mobile terminal.

According to one broad aspect, the invention provides a method of determining which one of an underlay carrier and an overlay carrier is to carry traffic for a wireless call associated with a mobile terminal, the method comprising: determining a resource parameter associated with a resource for carrying the traffic; determining a mobility parameter representing a mobility of the mobile terminal; and determining which of the underlay carrier and the overlay carrier is to carry the traffic as a function of the resource parameter and the mobility parameter.

In some embodiments, a method determining which of the underlay carrier and the overlay carrier is to carry the traffic as a function of the resource parameter and the mobility parameter is done as a function of hard hand-off history information, the hard hand-off history information reflecting a probability of hard hand-off as a function of the mobility parameter, the method further comprising maintaining the hard hand-off history information.

In some embodiments, determining which of the underlay carrier and the overlay carrier is to carry the traffic as a function of the resource parameter and the mobility parameter is done as a function of hard hand-off history information for a current time frame, the method further comprising maintaining hard hand-off history information for a plurality of time frames, the hard hand-off history reflecting a probability of hard hand-off during each time frame as a function of the mobility parameter.

In some embodiments, the overlay carrier is an isolated overlay carrier.

In some embodiments, the resource parameter is an increasing function of at least one of a forward power, a schedule time, a number of Walsh codes that the mobile terminal occupies, and a delay in transmission.

In some embodiments, the mobility parameter is correlatable with a likelihood of hand-off.

In some embodiments, the mobility parameter is a function of/correlatable to at least one of a location, distance, a non-radial speed in combination with a direction of travel of the mobile terminal, a radial speed.

In some embodiments, the determining which of the underlay carrier and the overlay carrier is to carry the traffic comprises: calculating a transfer function as a function of the resource parameter, the mobility parameter, and hard hand-off history information; if the wireless call is assigned to the underlay carrier, re-assigning the wireless call to the overlay carrier if the transfer function has a value within a first range of values; and if the wireless call is assigned to the overlay carrier, re-assigning the wireless call to the underlay carrier if the transfer function has a value within a second range of values.

In some embodiments, a method further comprises maintaining hard hand-off history information for a plurality of time frames.

In some embodiments, the first range of values and the second range of values are selected to avoid rapid alternation between the underlay carrier and the overlay carrier.

In some embodiments, the resource parameter is a function of a forward power for at least one of the carriers and the transfer function is a function of a ratio of the forward power and a probability of hard hand-off.

In some embodiments, a method is applied to each of K mobile terminals wherein K is an integer greater or equal to 1 and wherein for a mobile terminal k of the K mobile terminals where k is an integer satisfying k=1 . . . K, the method comprising: using a transfer function $T_k$ to determine which of the underlay carrier and the overlay carrier traffic is to carry the traffic for a wireless call associated with the mobile terminal k; wherein if the wireless call associated with the mobile terminal k is assigned to the underlay carrier, the transfer function $T_k$ is given by:

$$T_k = \frac{p_{k,u}}{H_k},$$

$P_{k,u}$ being a forward power on the underlay carrier for the call associated with the mobile terminal k and $H_k$ being a probability that the mobile terminal k will require a hard hand-off within a predetermined time; and wherein if the wireless call associated with the mobile terminal k is assigned to the overlay carrier, the transfer function is given by:

$$T_k = \frac{p_{k,o}}{H_k}$$

$P_{k,o}$ being a forward power on the overlay carrier for the wireless call associated with the mobile terminal k.

In some embodiments, a method is adapted for use with at least two underlay carriers and/or at least two overlay carriers.

In some embodiments, a method further comprises; transmitting traffic on the one of the underlay carrier and the overlay carrier determined and/or receiving traffic on any carrier, time slot or channel associated by duplexing to the one of the underlay carrier and the overlay carrier.

According to another broad aspect, the invention provides an apparatus for carrying traffic for a wireless call associated with a mobile terminal, the apparatus comprising: a memory for storing instructions; a processor adapted to, using the instructions: i) determine a resource parameter associated with a resource for carrying the traffic; ii) determine a mobility parameter representing a mobility of the mobile terminal; and iii) determine which one of the underlay carrier and the overlay carrier is to carry the traffic as a function of the resource parameter and the mobility parameter; and a transmitter adapted to transmit the traffic on any one of the underlay carrier and the overlay carrier determined and/or a receiver adapted to receive traffic on any carrier, time slot or channel associated by duplexing to the one of the underlay carrier and the overlay carrier.

In some embodiments, to determine which of the underlay carrier and the overlay carrier is to carry the traffic the processor is adapted to determine a transfer function that is a function of the resource parameter and the mobility parameter.

In some embodiments, the overlay carrier is an isolated overlay carrier.

In some embodiments, the resource parameter is a function of at least one of a forward power, a schedule time, a number of Walsh codes that the mobile terminal occupies, and a delay in transmission.

In some embodiments, the mobility parameter is a function of/correlatable to at least one of a location, distance, a non-radial speed in combination with a direction of travel of the mobile terminal, a radial speed.

In some embodiments, to determine which of the underlay carrier and the overlay carrier is to carry the traffic, the processor is adapted to: if the wireless call is assigned to the underlay carrier, re-assign the wireless call to the overlay carrier if the transfer function has a value within a first range of values; and if the wireless call is assigned to the overlay carrier, re-assign the wireless call to the underlay carrier if the transfer function has a value within a second range of values.

In some embodiments, to determine which one of the underlay carrier and the overlay carrier is to carry the traffic, the processor is adapted to: calculate the transfer function as a function of the resource parameter, the mobility parameter, and hard hand-off history information; if the wireless call is assigned to the underlay carrier, re-assign the wireless call to the overlay carrier if the transfer function has a value within a first range of values, the first range of values having a first limit defined by a first threshold; and if the wireless call is assigned to the overlay carrier, re-assign the wireless call to the underlay carrier if the transfer function has a value within a second range of values, the second range of values having a second limit defined by a second threshold.

In some embodiments, the processor is further adapted to: maintain hard hand-off history information allowing an estimate of a probability that the mobile terminal will require a hard hand-off within a predetermined time, the hard hand-off history information being maintained as a function of the mobility parameter; and use the probability to determine the transfer function.

In some embodiments, the resource parameter is a function of a forward power for at least one of the carriers and the transfer function is a function of a ration of the forward power and the probability.

In some embodiments, the processor is adapted to determine a resource parameter associated with a resource for carrying the traffic, and to determine a mobility parameter representing a mobility of the mobile terminal, and to determine which of the underlay carrier and the overlay carrier is to carry the traffic as a function of the resource parameter and the mobility parameter if reach of K mobile terminals wherein K is an integer greater or equal to 1.

In some embodiments, the processor is adapted to use a transfer function $T_k$ to determine which of the underlay carrier and the overlay carrier traffic from a wireless call associated with the mobile terminal k is to be carried on; wherein if the wireless call associated with the mobile terminal k is assigned to the underlay carrier, the transfer function $T_k$ is given by:

$$T_k = \frac{p_{k,u}}{H_k},$$

$P_{k,u}$ being a forward power on the underlay carrier for the call associated with the mobile terminal k and $H_k$ being a probability that the mobile terminal k will require a hard hand-off within a predetermined time; and wherein if the wireless call associated with the mobile terminal k is assigned to the overlay carrier, the transfer function is given by:

$$T_k = \frac{p_{k,o}}{H_k}$$

$P_{k,o}$ being a forward power on the overlay carrier for the wireless call associated with the mobile terminal k.

In some embodiments, a base station comprises the apparatus as summarized above and further comprises: a receiver adapted to receive information associated with the resource parameter and/or the mobility parameter.

In some embodiments, a base station is further adapted to collect information associated with the resource parameter from within the base station.

In some embodiments, a capacity to provide the resource for carrying the traffic increases with use of the overlay carrier.

According to another broad aspect, the invention provides an article of manufacture comprising: a computer usable medium having computer readable program code means embodied therein for determining which one of an underlay carrier and an overlay carrier traffic is to carry traffic for a wireless call associated with a mobile terminal, the computer readable code means in said article of manufacture comprising: computer readable code means for determining a resource parameter associated with a resource for transmitting the traffic; computer readable code means for determining a mobility parameter representing a mobility of the mobile terminal; and computer readable code means for determining which of the underlay carrier and the overlay carrier is to carry the traffic as a function of the resource parameter and the mobility parameter.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In a cellular network, a call from a mobile terminal in a cell may be carried at a first carrier frequency $f_1$ on a carrier referred to as an underlay carrier. In some cases a cell has one or more additional carriers referred to as overlay carriers over which traffic can be transmitted at respective carrier frequencies. For example, in a cell traffic associated with a call may be transmitted on the underlay carrier at the first carrier frequency $f_1$ or on a second carrier at the second carrier frequency $f_2$. Different hand-off scenarios are used when a mobile terminal moves from one cell to another depending on whether a charge in carrier is required.

For simultaneous bi-directional communication, it is to be understood that there may exist a duplexing method associated with each carrier frequency. Within the duplexing method, there may exist other frequencies, time slots or channels that have a fixed associated with the carrier frequency such that a call associated with the carrier frequency is also associated with those frequencies, time slots or channels. Embodiments of the invention may be applied to simplex traffic or to duplex traffic. If applied to duplex traffic, carrying the traffic is to be understood as performing both transmit and receive functions for bi-directional traffic.

Figure 1:
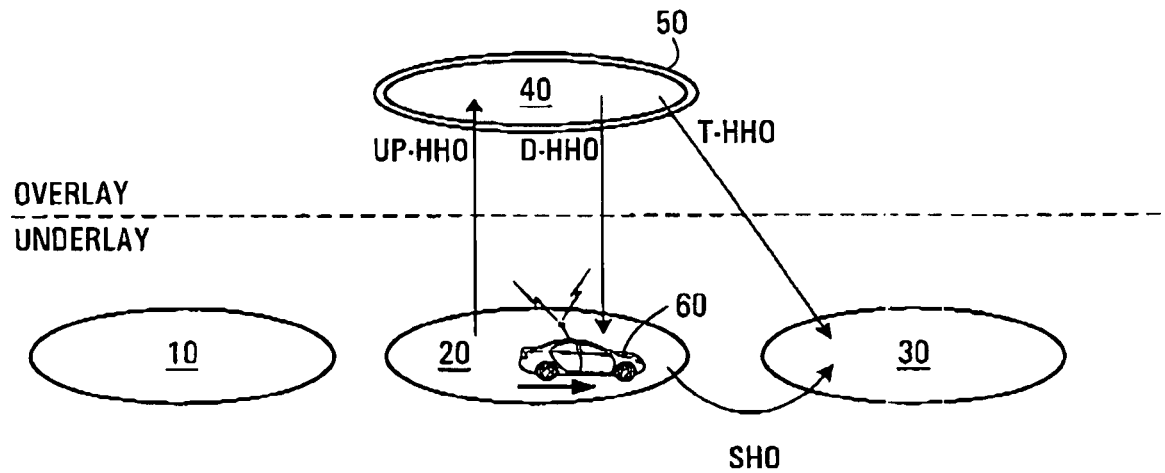
FIG. 1 is a diagram of possible hand-off scenarios between cells in a cellular network.

Referring to FIG. 1, shown is a diagram of possible hand-off scenarios between cells in a cellular network. In FIG. 1 there are four cells 10, 20, 30, 40 over which traffic can be transmitted between mobile terminals (only one mobile terminal 60 is shown in cell 20 for clarity) and base stations (not shown). Each cell 10, 20, 30 is supported by a respective base station and traffic is carried at the first carrier frequency $f_1$ on an underlay carrier. The base station responsible for cell 20 also has capabilities of transmitting at the second carrier frequency $f_2$ on an overlay carrier in a region defined by cell 40 and in fact in some cases cells 20, 40 can be considered a single cell with multiple carrier frequencies. In FIG. 1, cell 40 is co-located with cell 20; however, in some other implementations cells 20, 40 defined by the underlay and overlay carriers are not co-located. In FIG. 1, cells 10, 30 are neighboring cells of cells 20, 40 and in cells 10, 30 traffic can only be transmitted at the first carrier frequency $f_1$. In such a case the overlay carrier of cell 40 is referred to an isolated overlay carrier. It is to be clearly understood, however, that the invention is not limited to implementations in which the overlay carrier is an isolated overlay carrier. For example, in another implementation traffic can be transmitted at the second frequency $f_2$ in any subset of cells.

In FIG. 1, four types of hand-offs are shown. An UP-HHO (Up Hard Hand-Off) happens when there is a transfer from the underlay carrier of cell 20 to the overlay carrier of cell 40; a D-HHO (Discretionary Hard Hand-Off) happens when there is a transfer from the overlay carrier of cell 40 to the underlay carrier of cell 20; a SHO (Soft Hand-Off) happens when there is a simultaneous connection of the mobile terminal to two or more cells on the same frequency; this may happen for example when a mobile terminal moves from being exclusively in the coverage area of cell 20 to being in an overlap region (not shown) between cells 20,30; if the mobile terminal then moves to an area exclusively serviced by cell 30, then the soft hand-off ends; T-HHO (Triggered Hard Hand-Off) happens when there is a transfer from the overlay carrier of cell 40 directly to the underlay carrier of cell 30. A SHO can also occur between cells 10 and 20 and between cells 30 and 20. A T-HHO can also occur between cells 40 and 10.

D-HHOs and T-HHOs use the same hand-off mechanism but as discussed in further detail below these two types of hand-offs are triggered by different conditions. Furthermore, a HHO between cells 20, 40 is less likely to result in the cell being dropped than an HHO between cell 40 and 30 because "cells" 20, 40 are typically serviced by the same basestation. As such, according to an embodiment of the invention, T-HHOs are avoided by performing pre-empting D-HHOs. In particular, a D-HHO is used when a HHO condition is likely to occur at a next polling period. For example, a mobility of mobile terminal 60 may be monitored at different polling periods and if it appears that the mobile terminal 60 is about to trigger a HHO, a D-HHO is instigated. In contrast, T-HHO occurs for calls assigned to the overlay carrier when the trigger condition actually occurs. An example of a trigger condition is signal quality degradation. The transfer from the overlay carrier of cell 40 to the underlay carrier of cell 20 using a D-HHO allows a call to undergo a SHO when the mobile terminal 60 moves from cell 20 to cell 30.

In some embodiments of the invention, the overlay carrier is used to transmit forward power to mobile terminals thereby reducing the total forward power on the underlay carrier and as a result reducing interference on the underlay carrier and increasing cell capacity. As discussed above the overlay carrier is isolated in that cells 10, 30 do not make use of the overlay carrier. As such, the overlay carrier experiences little to no out of cell interference. However, the overlay carrier of cell 40 serves mobile terminals using a single link and transfers to an from the cell 40 are made using HHOs (Hard Hand-Offs). HHOs can be risky in that calls can be dropped if they occur for example at edge 50 of cell 40. As such, to reduce the risk of calls being dropped, in some embodiments of the invention traffic from calls that are not likely to require a hand-off before a next polling period is transmitted using the overlay carrier and traffic from calls that are likely to require a hand-off before a next polling period is transmitted using the underlay carrier.

There are three transfer sequences of important for a call associated with mobile terminal 60 moving through cell 20 and into cell 30. In a first sequence, traffic associated with the call is transmitted using the underlay carrier only, and a SHO occurs when mobile terminal 60 moves from cell 20 into cell 30. For this first sequence, since traffic is carried on the underlay carrier only, there is no forward power associated with the call being moved to the overlay carrier. In a second sequence, an UP-HHO occurs and traffic associated with the call is transmitted on the overlay carrier until a D-HHO occurs prior to mobile terminal 60 moving into cell 30. As mobile terminal 60 moves into cell 30 a SHO occurs. In the second sequence, forward power for the call is transferred to the overlay carrier while transmission is on the overlay carrier thereby providing a relief on the load on the underlay carrier and providing a reduction in interference. Furthermore, as will be discussed in more detail below, in some embodiments of the invention the second sequence is used to provide a balance between an increase in capacity and hand-off risk associated with HHOs by transferring calls to the overlay carrier and returning them to the underlay carrier prior to mobile terminal 60 exiting cell 20. In a third sequence, an UP-HHO occurs and transmission of traffic proceeds on the overlay carrier until mobile terminal 60 moves into cell 30 at which point a T-HHO occurs. The third sequence can be used to provide an increase in capacity but also increases the probability of HHO failure.

Figure 2:
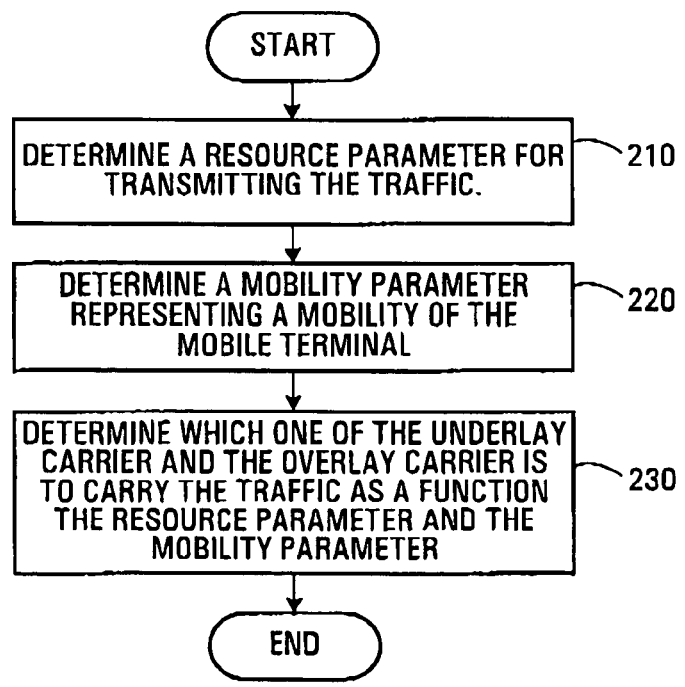
FIG. 2 is a flow chart of a method of allocating traffic associated with a call at a mobile terminal, in accordance with an embodiment of the invention.

To reduce the probability of T-HHOs occurring, traffic associated with calls from mobile terminals which are not likely to require T-HHo within a period of time are given a greater likelihood of being transmitted on the overlay carrier of cell 40 than traffic assisted with calls from other mobile terminals which are likely to require T-HHO. With reference to FIG. 2, a method of employing the overlay carrier of cell 40 and the underlay carrier of cell 20 for a call will now be described in accordance with an embodiment of the invention. The traffic is capable of being transmitted on an underlay carrier and an overlay carrier such as for example, the underlay carrier of cell 20 and the overlay carrier of cell 40. At step 210 a resource parameter associated with a resource for transmitting the traffic is determined. In some embodiments of the invention, the resource is such that a capacity to provide the resource for transmitting the traffic increases with use of the overlay carrier. Examples of suitable resource parameters are given below. At step 220 a mobility parameter of the mobile terminal is determined. Detailed examples of the mobility parameter are given below. At step 230 the carrier on which the traffic is to be carried is determined as a function of the resource parameter and the mobility parameter. This may involve calculating a transfer function, performing a table look-up, or otherwise factoring in both the resource parameter and the mobility parameter.

In some embodiments of the invention, steps 210, 220 and 230 are performance periodically. For example, in one implementation steps 210, 220, and 230 are repeated at each of a plurality of polling periods $T_s$. As will be discussed in further detail below, in some implementations the resource parameter is for example a function of at least one of forward power, schedule time, number of Walsh codes that a mobile terminal occupies, and a delay in transmission. In some implementations, the mobility parameter is for example a function of/correlatable to at least one of a location, distance, a non-radial speed in combination with a direction of travel of the mobile terminal, and a radial speed. More generally, the parameter may be a function of any measurable quantity that is correlatable with the likelihood of hand-off. Furthermore, as will be discussed in more detail below, in some implementations, the transfer function is a function of a ratio of the resource parameter and the mobility parameter.

The method of FIG. 2 is described with reference to a single call; however, in some implementations the method is applied to a plurality of calls each associated with a respective mobile terminal. Applying the method of FIG. 2 to a plurality of calls allows for assigning some of the calls to the overlay carrier and assigning other calls to the underlay carrier. How the calls are assigned depends on how the method is implemented. There are many ways of implementing the method of FIG. 2 and each implementation can be set up for a specific goal.

For example, in one implementation T-HHOs are to be avoided and a large penalty is associated with T-HHOs, however, D-HHOs are acceptable and a smaller penalty is associated with D-HHOs. Such an implementation is used for example when D-HHOs are much more reliable than T-HHOs. In such an implementation, one approach is to implement the method of FIG. 2 to maximize capacity while controlling the amount of T-HHOs. In this implementation, since the penalty associated with D-HHOs is small, the overlay carrier can be used to provide an increase in capacity by allowing traffic associated with some calls to be transmitted on the overlay carrier and then transferring the call back to the underlay carrier using a D-HHO prior to the mobile terminal moving into an another cell. In such an implementation, the mobility of the mobile terminal is determined both when the underlay carrier is used to trigger an UP-HHO and when the overlay carrier is used to trigger a D-HHO when appropriate.

An example implementation of the method of FIG. 2 will now be described. With reference to FIG. 1, in the example implementation there is a plurality of mobile terminals (only mobile terminal 60 is shown for clarity) in cell 20. The example implementation is used for example when the rate at which calls are dropped is predominantly due to T-HHO failure. However, it is to be clearly understood that the example implementation can be implemented for other scenarios.

In the example implementation calls are separated between the overlay carrier and the underlay carrier using the method of FIG. 2. In the example implementation, the system over which transmission occurs is forward link limited in that base station 300 is limited in the amount of forward power that can be provided for transmitting traffic, and is capacity limited by the amount of forward power (due to interference) that can be provided.

In the example implementation, at a particular time cell 20 has K mobile terminals (not shown) numbered k=1 . . . K. Each mobile terminal k of the K mobile terminals handles one call at a time and the formalism described below is described for this particular case; however, it is to be clearly understood that one of skill in the art would understand that the formalism can be extended to the case when the K mobile terminals are capable of handling more than one call simultaneously.

In the example implementation, a mobile terminal k has the following attributes:
- a forward traffic power $p_{k,u}$ for transmission on the underlay carrier;
- an estimated radial speed $s_k$;
- an estimated radial distance $r_k$ from the base station 300; and
- a flag $W_k=1$ if traffic from a call associated with the mobile terminal k is being transmitted on the underlay carrier, and $W_k=0$ if the traffic is being transmitted on the overlay carrier.

In the example implementation, even if traffic from the call is being transmitted on the overlay carrier, $p_{k,u}$ indicates the forward power that would be used if the traffic was transmitted on the underlay carrier. A probability that traffic from a call associated with the mobile terminal k is on the underlay carrier ($W_k=1$) is $w_k$. In the example implementation, a switching rule for switching between the underlay carrier and the overlay carrier is designed by making $w_k$ depend on resource and mobility parameters useful for providing an increase in capacity without compromising reliability. In particular, in the example implementation the probability $w_k$ of mobile terminal k being on the underlay depends on the forward traffic power $p_{k,u}$, the estimated radial speed $s_k$, and the estimated radial distance $r_k$. As such, the probability $w_k$ is given by $w_k=w(r_k,s_k,p_{k,u})$. The probability $w_k=w(r_k,s_k,p_{k,u})$ will now be further defined for this example implementation.

A probability that a call associated with the mobile terminal k would require a T-HHO, if it were on the overlay carrier, before the next time that hand-off is considered, is given by $H_k$. In the example implementation, a transfer function for mobile terminal k is given by $$T_k = p_{k,u}/H_k$$

where $p_{k,u}$ corresponds to the resource parameter and $H_k$ corresponds to the mobility parameter. Furthermore, hand-off is re-assessed once every $T_s$ seconds, with $T_s$ corresponding to a polling period.

Within the cell 20, a number $N_{K,u}$ of the K mobile terminals for which transmission is expected to be on the underlay carrier is given by $$N_{K,u} \sum_{k=1}^{K} w_k. \tag{1}$$

Within cell 20, a number $N_{K,o}$ of the K mobile terminals for which transmission is expected to be on the overlay carrier is given by $$N_{K,o} = \sum_{k=1}^{K} (1-w_k). \tag{2}$$

A total forward traffic power $P_t$ on the underlay carrier is given by $$P_t = \sum_{k=1}^{K} w_k p_{k,u}. \tag{3}$$

A particular assignment of calls to the underlay carrier is specified by a vector $\{W_k\}_{k=L}^{K}$ and gives rise to an average underlay forward power $\overline{P}_u$ given by $$\overline{P}_u = \sum_{k=1}^{X} w_k p_{k,u} \Big/ \sum_{k=1}^{K} w_k. \tag{4}$$

An average forward power X is the expectation of the average underlay forward power $\overline{P}_u$ and is given by $$X = E\left[\frac{\sum_{k=1}^{K} w_k p_{k,u}}{\sum_{k=1}^{K} w_k}\right]. \tag{5}$$

In the example implementation, the average underlay forward power $\overline{P}_u$ is approximated by the average forward power X, which is given by $$X \approx \sum_{k=1}^{K} w_k p_{k,u} \Big/ \sum_{k=1}^{K} w_k. \tag{6}$$

In one polling period $T_s$, if a call associated with the mobile terminal k is assigned to the overlay carrier, the probability that it requires a T-HHO is $H_k$. Removing the constraint that the call associated with the mobile terminal k is assigned to the overlay carrier, the probability that the mobile terminal k requires a T-HHO is $H_k \cdot Pr_{k,o}$ where $Pr_{k,o} = 1 - w_k$ is a probability that the call associated with the mobile terminal k is assigned to the overlay carrier. At equilibrium, a steady state probability is approximated by the probability $Pr_{k,o}$. It follows that an expected number $N_h$ of hard hand-offs per polling period $T_s$ for K calls is given by $$N_h = \sum_{k=1}^{K} (1 - w_k) H_k. \quad (7)$$

Normalizing using the number of calls $N_c = K$ and the sampling interval corresponding to the polling period $T_s$, gives a normalized hand-off rate h given by $$h = \frac{1}{KT_D} \sum_{k=1}^{K} (1 - w_k) H_k. \quad (8)$$

As discussed above, in the example implementation the goal is to offload calls assigned to the underlay carrier onto the overlay carrier while at the same time controlling the number T-HHOs. In the example implementation, a balance between these two considerations is expressed formally using constrained optimization.

In another embodiment, the method can be viewed as separating calls that do not require HHO from calls that may require HHO. Under fixed traffic assumptions, the method can be used to achieve some fixed ratio between these two types of calls. For example, if the ratio is 7:3, and 10 more calls are to be accommodated, then there must be room for 7 calls in the underlay and 3 calls on the overlay. If we elect to server the 3 calls and block the 7 calls then we have not increased capacity because cell capacity is defined under a blocking constraint. Capacity can be defined as the maximum traffic level at which neither the overlay nor the underlay are violating the blocking constraint. Because of reduced interference at the overlay, it is likely that the underlay has lower capacity than the overlay and will block traffic at a lower level. Thus, the capacity limitation is imposed by the underlay, and the underlay is typically interference limited.

An optimization to consider is one that maximizes a function associated with a resource subject to a constraint on the normalized hand-off rate h. In the example implementation, the function is defined as the average underlay forward power $\bar{P}_u$ and is used to optimize a capacity. This implies that a total capacity of the overlay carrier plus that of the underlay carrier is limited by interference on the underlay carrier. As discussed above, the average forward power X is used as an approximation to the average underlay forward power $\bar{P}_u$. Furthermore, a constraint $h_{target}$ is set on the normalized hand-off rate h. The constraint $h_{target}$ limits the normalized hand-off rate h to $h < h_{target}$ and is implemented using a Lagrange multiplier $\lambda$ to form a Lagrangian equation given by $$L_c = x - \lambda(h - h_{target}) \quad (9)$$

where $L_c$ is an optimized average underlay forward power. For this constrained optimization $L_c$ satisfies a set of equations $\{\partial L_c / \partial w_k = 0\}_{k=1}^{K}$. In some cases, the solution to $L_c$ automatically satisfies another constraint $\{0 \leq w_k \leq 1\}_{k=1}^{K}$; however, in other cases this other constraint is explicitly imposed using additional Lagrange multipliers. To obtain the set $\{w_k\}_{k=1}^{K}$, the set of equations defined by $\{\partial L_c / \partial w_k = 0\}_{k=1}^{K}$ is solved.

In some implementations, the set of equations $$\{\partial L_c / \partial w_k = 0\}_{k=1}^{K}$$

is for example a quadratic system of equations or a set of linear equations; however, it is to be clearly understood that the invention is not limited by the type of equations being solved.

In another implementation, the function to be optimized is defined by the total forward power $P_t$. The constraint $h_{target}$ is again set on the normalized hand-off rate h and another Lagrangian equation is given by $$L_p = P_t - \lambda(h - h_{target}) \quad (*10)$$

where $L_p$ is an optimized total forward traffic power. For this constrained optimization, $L_p$ satisfies a set of equations $$\{\partial L_c / \partial w_k = 0\}_{k=1}^{K}.$$

Lagrangian Equation (10) is used to balance the total forward power $P_t$ on the underlay carrier versus the overlay hand-off rate h. Shifting some of the calls to the overlay carrier reduces the amount of underlay power used to transmit traffic on the underlay carrier for the remaining calls and creates space in the power budget of base station 300 to accommodate more calls on the underlay carrier thereby increasing the capacity to accommodate calls.

Optimization according to Equation (10) will now be described in more detail. The optimization requires that the set of equations defined by $$\{\partial L_P / \partial w_k = 0\}_{k=1}^{K}$$

be satisfied. Using Equations (3), (8) and (10) partial derivatives $\partial L_P / \partial w_k$ are given by $$\partial L_P / \partial w_k = p_{k,u} + \lambda \frac{1}{KT_k} H_k. \quad (11)$$

Equation (11) cannot be solved for a $w_k$-value that yields zero partial derivative. Re-writing $L_p$ using Equations (3), (8), and (10) gives $$L_P = \sum_k w_k p_{k,u} - \lambda \left( \frac{1}{KT_k} \sum_k (1 - w_k) H_k - h_{target} \right) \quad (12)$$

$$= \sum_k w_k \left( p_{k,u} + \lambda \frac{2}{KT_k} H_k \right) + \lambda \left( h_{target} - \frac{1}{KT_k} H_k \right).$$

In particular, Equation (12) is a linear function of $w_k$ and increases or decreases with increasing $w_k$ depending on whether $$p_{k,u} + \lambda \frac{1}{KT_k} H_k$$

is positive or negative. The probability $w_k$ is limited to the range $0 \leq w_k \leq 1$ and $L_P$ is optimized for $w_k = 0$ and $w_k = 1$. As such, to minimize $L_P$, $w_k$ is set to 0 or 1 depending on the sign of $$p_{k,u} + \lambda \frac{1}{KT_k} H_k.$$

In such an implementation, $w_k=0$ or $w_k=1$. Given the probability $w_k$ there are many ways of implementing rules for assigning calls to the overlay carrier and to the underlay carrier. Some possible ways of implementing rules will now be described. For convenience, a threshold $\eta$ is defined as $$\eta = -\lambda \frac{1}{KT_k} H_k.$$

In one implementation, a first rule is used. If $$T_k = p_{k,u}/H_k > \eta$$

then a call associated with mobile terminal k is assigned to the overlay carrier; otherwise, the call is assigned to the underlay carrier.

More generally, the first rule is the re-cast as follows: if a call is assigned to the underlay carrier, then the call is re-assigned to the overlay carrier if the transfer function has a value within a first range of values. If the call is assigned to the overlay carrier, the the call is re-assigned to the underlay carrier if the transfer function has a value within a second range of values, wherein the second range of values and the first range of values are mutually exclusive ranges of values and are separated by a threshold. For example, in the example implementation the first range is given by $T_k > \eta$ and the second range of values is given by $T_k < \eta$, wherein $\eta$ is the threshold.

In some implementations, $H_k$ is re-evaluated at each polling period $T_s$ and this may cause a "ping-pong" effect in which assignment of the call alternates between the underlay carrier and the overlay carrier. Finally, this rules makes use of the forward power $P_{k,u}$ to determine which carrier call associated with mobile terminal k is to be assigned even when the call is assigned to the overlay carrier. This requires that the forward power $P_{k,u}$ be known even when the call is assigned to the overlay carrier.

In another implementation, a second rule is used. According to the second rule, if $$T_k = p_{k,u}/H_k > \eta_u$$

where $\eta_u$ is a first threshold then the call is re-assigned to the overlay carrier; otherwise, the call remains assigned to the underlay carrier. Furthermore, when the call is assigned to the overlay carrier, if $$T_k = p_{k,o}/H_k < \eta_o$$

where $P_{k,o}$ is a forward power of the call when assigned to the overlay carrier and $\eta_o$ is a second threshold, then the call is re-assigned to the underlay carrier; otherwise the call remains assigned to the overlay. In some embodiments, the thresholds $\eta_o$ and $\eta_u$ are system design parameters that may, for example, be selected to introduce a hysteresis behavior to control the alternation of assignment of calls between the underlay carrier and the overlay carrier from one polling period to another. Decreasing the first threshold $\eta_u$ causes an increase in traffic carried on the overlay carrier; however, increasing the first threshold $\eta_u$ causes a decrease in the overlay hard hand-off rate h. Increasing the second threshold $\eta_o$ causes more traffic to exit the overlay carrier by way of D-HHO, thereby reducing the overlay hard hand-off rate h, which includes both D-HHOs and T-HHOs; however, decreasing the second threshold $\eta_o$ causes less traffic to be carried on the underlay carrier.

In cases where downlink interferences $I_o$ and $I_n$ on the overlay carrier and the underlay carrier, respectively, are proportional to the forward powers and $$p_{k,u}/I_u = p_{k,o}/I_o$$

is satisfied, the second rule reduces to the first rule if the thresholds $\eta_o$ and $\eta_u$ are scaled as $$\eta_o = \eta_u \cdot (I_o/I_u)$$

More generally, the second rule is stated as follows: if the call is assigned to the underlay carrier, then the call is re-assigned to the overlay carrier if the transfer function $T_k$ has a value within a first range of values, the first range of values having a first limit defined by a first threshold. Furthermore, if the call is assigned to the overlay carrier, then the call is re-assigned to the underlay carrier if the transfer function has a value within a second range of values, wherein the second range of values has a second limit defined by a second threshold. For example, in the example implementation the first range of values is given by $T_k > \eta_o$ wherein $\eta_o$ is the first threshold and the second range of values is given by $T_k < \eta_u$ wherein $\eta_u$ is the second threshold. The first and second ranges may overlay in practice if $p_{k,u}$ and $p_{k,o}$ are sufficiently unrelated, for example in the presence of external forward interference at the overlay frequency.

Figure 3:
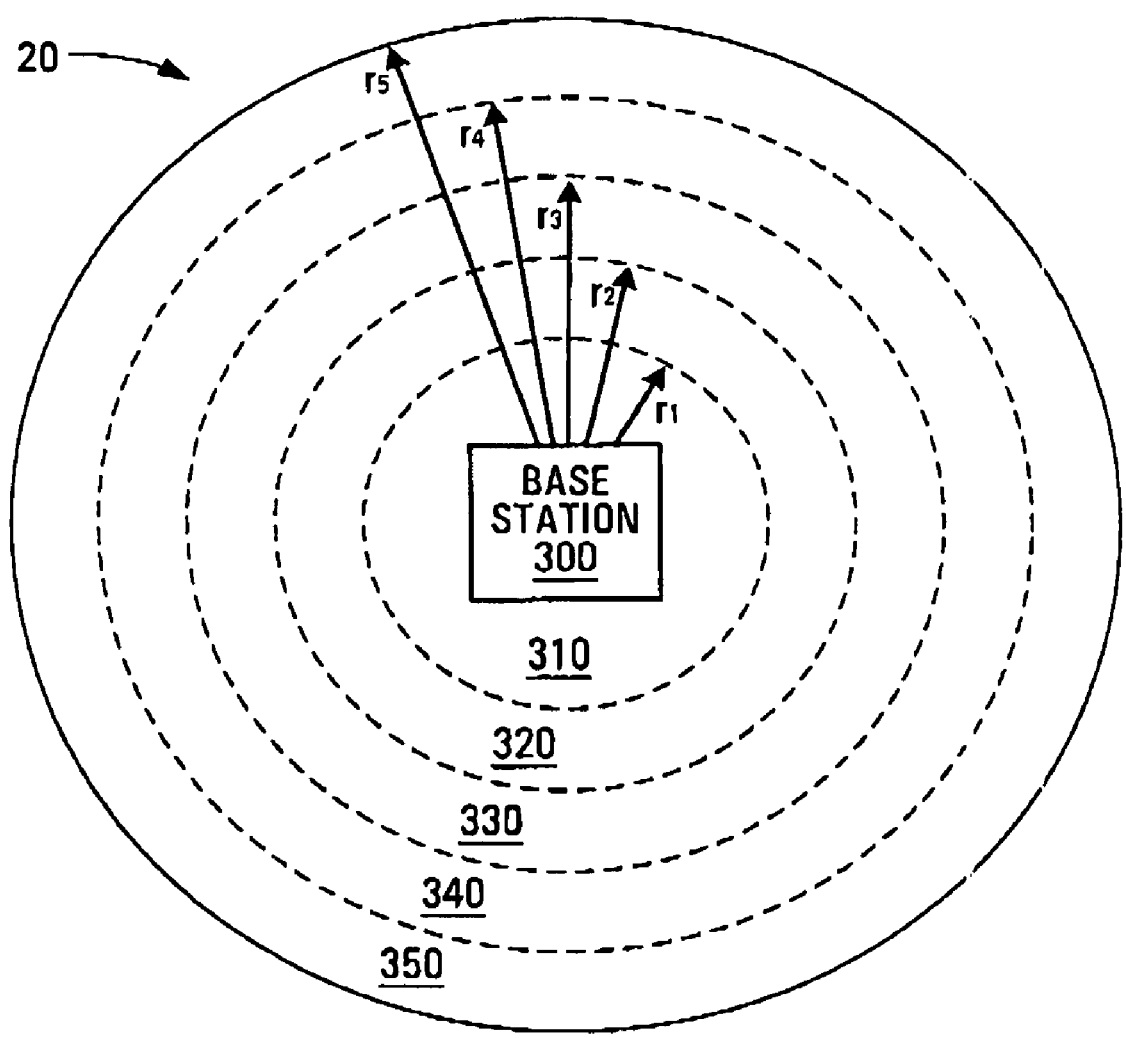
FIG. 3 is a diagram of a cell of FIG. 1 showing different areas of the cell.

The assignment of calls to the underlay carrier and to the overlay carrier in the example implementation depends on the probability $H_k$. A method of determining the probability $H_k$ will now be described with reference to FIGS. 3 and 4. As shown in FIG. 3, cell 20 has a base station 300 and areas 310, 320, 330, 340, 350 each defined within a respective range of radii, $r_b$ where b=1 ... 5. In particular, area 310 is in a range 0 to $r_1$; area 320 is in a range $r_1$ to $r_2$; area 330 is in a range $r_2$ to $r_3$; area 340 is in a range $r_3$ to $r_4$; and area 350 is in a range $r_4$ to $r_5$. In the example implementation $r_1$=500 m, $r_2$=1000 m, $r_3$=2000 m, $r_4$=4000 m, r5=5000 m. Each of the K mobile terminals is in one of the areas 310, 320, 330, 340, 350 at any one time and information is kept for each area 310, 320, 330, 340 350 to determine the probability $H_k$.

In the example implementation, the probability $H_k$ depends on the radial distance $r_k$, the speed $s_k$, and a traffic time frame $t_f$ and is given by $H_k = H(r_k, s_k, t_f)$. In this particular example, the traffic time frame represents the time of day. By using the traffic time frame, differences in system behavior as a function of time can be accommodated. In other implementations, only a single set of probabilities for all times collectively is maintained.

To obtain $H(r_k, s_k, t_f)$, a database of time traces $\{r_k(t), s_k(t), u_k(t),$ where t is time, and k=1 ... K} collected for $N_c$=K calls within the time frame $t_f$ which might for example be an hour long, where $r_k(t)$ is the radial distance $r_k$ of mobile terminal k from base station 300 as a function of time t, $s_k(t)$ is the speed $s_k$ of mobile terminal k from base station 300 as a function of time t, and $u_k(t)$ is a flag which "true" if mobile terminal k "exits" the cell 20, otherwise it is "false". A mobile terminal is said to "exit" a cell at time t if there is a T-HHO trigger after time t and before item $t+T_s$. A T-HHO trigger occurs for example when the distance $r_k$ is greater than a threshold distance $R_0$, $r_k > R_0$. In some implementations $r_k$ is determined from a measured RTD (Round Trip Delay) for example. Alternatively, in some implementations whether or not a T-HHO trigger occurs is determined using for example a signal quality threshold or an RTD threshold.

In the example implementation, to obtain $H(r_k, s_k, t_f)$ statistics are kept for the radial speed $s_k$ and the distance $r_k$. In particular, categories j are defined for speed of mobile terminals where j is an integer greater or equal to 1. Each category j has an associated range of speeds. Furthermore, a cell has N areas where N is an integer satisfying; $N \geq 1$. In the example implementation, as shown in FIG. 3 there are five areas 310, 320, 330, 340, 350. To obtain $H(r_k, s_k, t_f)$ a number of polling periods $a(i,j,t_f)$ mobile terminals in area i have speeds within the range j during time frame $t_f$ is kept. In the example implementation, for areas 310, 320, 330, 340, 350, i=1, 2, 3, 4, 5, respectively. Similarly, a number of polling periods $b(i,j,t_f)$ mobile terminals in area i and having speeds within the range j exit the cell 20 within time frame $t_f$ is kept. For each occurrence of time frame $t_f$, which might be on a daily basis for example, the numbers $a(i,j,t_f)$ and $b(i,j,t_f)$ are updated.

In the example implementation, an estimate $H(i,j,t_f)$ for $H(r_k, s_k, t_f)$ is given by $$H(i, j, t_f) = \frac{b_0 + b(i, j, t_f)}{a_0 + a(i, j, t_f)} \quad (13)$$

where $a_0$ and $b_0$ are pseudo-counts. The pseudo-counts $a_0$ and $b_0$ are used for biasing the algorithm towards the underlay carrier.

Figure 4:
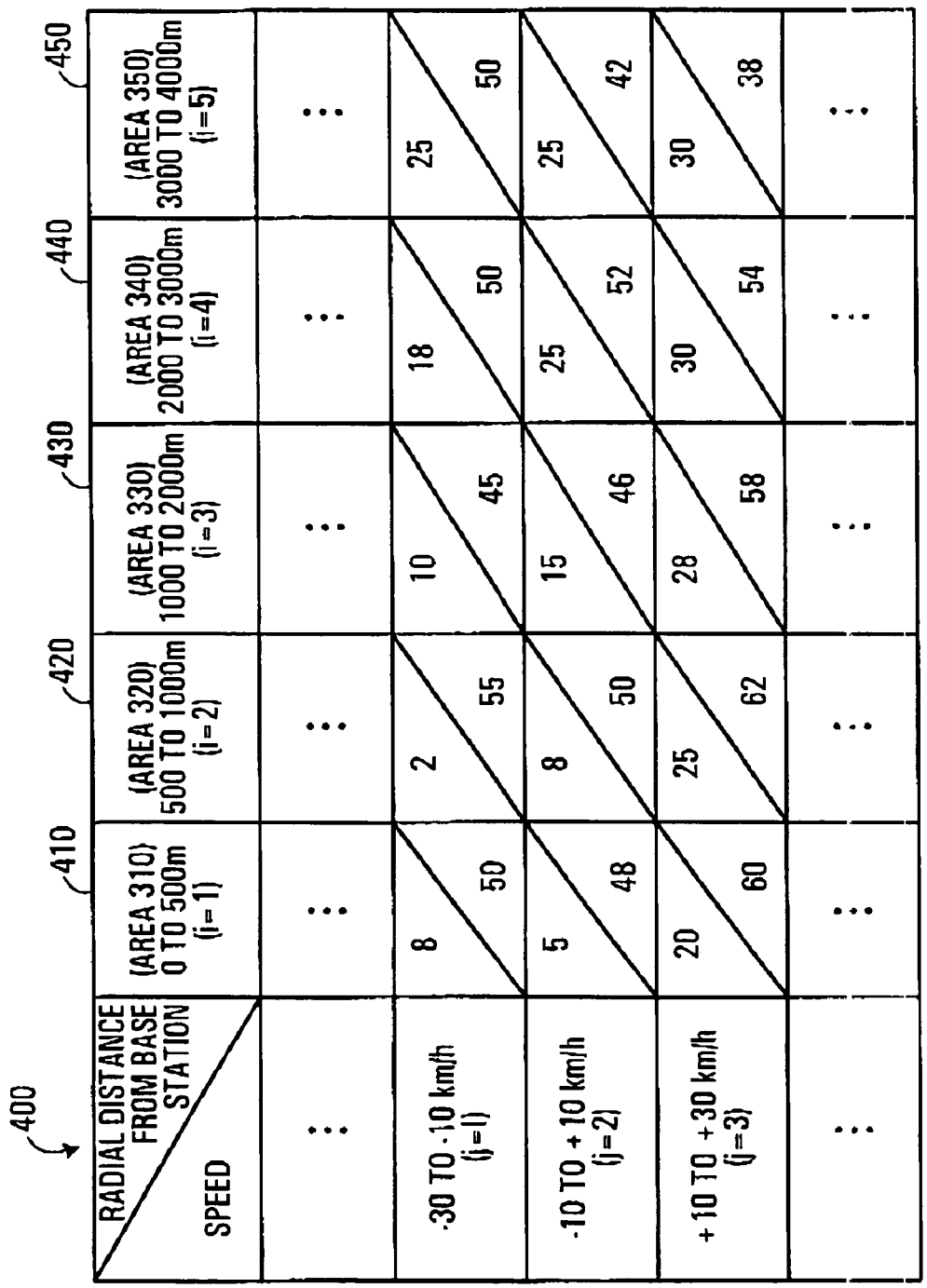
FIG. 4 is a table containing information for each of the areas of the cell of FIG. 3 which is used to determine a probability $H_k$ that a call associated with a mobile terminal k requires a HHO before a next polling period.

Referring to FIG. 4, shown is a table generally indicated by 400 containing information for each of the areas 310, 320, 330, 340, 350 of cell 20 of FIG. 3 which is used to determine the probability $H_k$ that a call associated with mobile terminal k requires a HHO before a next polling period. In particular, table 400 lists $a(i,j,t_f)$ and $b(i,j,t_f)$ that are kept for obtaining the estimate $H(i,j,t_f)$ in the example implementation. Columns 410, 420, 430, 440, 450 list $a(i,j,t_f)$ and $b(i,j,t_f)$ for areas 310, 320, 330, 340, and 350, respectively, for different ranges of speeds j. In table 400 a negative speed corresponds to movement towards base station 300 and a positive speed corresponds to movement away from base station 300. In table 400, $a(i,j,t_f)$ and $b(i,j,t_f)$ are listed for each combination of i and j in the form $a(i,j,t_f)/b(i,j,t_f)$. For example, for a mobile terminal having a speed +8 km/h and being a distance of 1500 m from base station 300, such a mobile terminal is in area 330 (i=3; column 430) and category j=2 for which $a(3,2,t_f)$ and $b(3,2,t_f)$=46. By keeping a list of the numbers $a(i,j,t_f)$ and $b(i,j,t_f)$, the estimate $H(i,j,t_f)$ is obtained using Equation (13). In particular, for a call associated with mobile terminal k, values for the numbers $a(i,j,t_f)$ and $b(i,j,t_f)$ are looked-up n Table 400 based on the speed $s_k$ and the distance $r_k$ and then the estimated probability $H(i,j,t_f)$ is obtained using Equation (13). The table is an example of hard hand-off history information that reflects a probability of hard hand-off for a particular mobility. Hard hand-off history information can be maintained in completely different forms from the particular example given. For implementations with time dependent statistics maintained, such as the above detailed example, the particular set of numbers used is selected by determining which item frame the current time falls within.

In the example implementation, the speed $s_k$ and the radial distance $r_k$ are both determined using RTD information obtained from the K mobile terminals. In table 400 there are only three categories shown for clarity. More generally, there may be one or more categories. For example, in another implementation there are four categories: unknown, slow, approach, depart. Furthermore, in the example implementation cell 20 has five areas 310, 320, 330, 340, 350. More generally, there may be one or more areas. For example, in another implementation there are two areas, one defining a region close to base station 300 and another defining a region far from base station 300. Furthermore in the example implementation, areas 310, 320, 330, 340, 350 are defined in terms of a radial distance from base station 300; however, the invention is not limited to defining areas in term of a radial distance from a base station 300. For example, a cell might have one or more hot spots where there is more traffic and in some implementations areas are defined to cover the hot spots. In some implementations more refined speed and distance estimates are used depending on the amount of trace data available to estimate mobility parameters. For example, if the speed estimate has an accuracy of 1 km/h, then the speed categories can be as narrow as 1 km/h provided there is enough trace data to ensure the values maintained are meaningful. IN some embodiments, the table may contain a row for unknown speed in which case only the radial distance is used. Also, it is noted that a mapping/calibration of the table data to actual speed and/or radial distance does not necessarily need to take place. Alternatively, a parameter space employing any parameters that are correlatable with the likelihood of hand-off can be partitioned in a similar manner. For example, one skilled in the art could apply neural network methods and related tools to establish a correlation between mobility parameters and the occurrence of hard hand-off. The narrower the correlation with such a parameter space with the likelihood of hand-off, the better the performance.

In the example implementation the use of the overlay carrier provides an increase in capacity; however, to provide a substantial increase in capacity the K calls that are candidates for being assigned to the overlay carrier preferably make-up a significant proportion of the total forward traffic power. Furthermore, there is preferably a significant fraction of calls that are safe for transmission on the overlay carrier. To illustrate, the K calls are divided into three groups: 1) $K_u$ calls assigned to the underlay carrier that are candidates for the overlay carrier and have an average forward power $p_u$; 2) $K_o$ calls assigned to the overlay carrier and have an average forward power $p_o$; and 3) $K_e$ calls assigned the underlay carrier which are not candidates for the overlay carrier and have an average power $p_e$. A baseline average power $p_b$ per call is given by $$p_b = \frac{(K_u p_u + K_o p_o + K_e p_e)}{K_u + K_o + K_e}. \quad (14)$$

Equation (14) is for the particular case where a call uses the same forward power on the overlay carrier as on the underlay carrier. An underlay average power $p_u$ power call is given by $$P_u = \frac{(K_u p_u + K_e p_e)}{(K_u + K_e)}. \quad (15)$$

If cell 20 is limited in its capacity by interference, a relative cell capacity including both the underlay carrier and the overlay carrier is given by $$C = \frac{p_b}{p_u} \quad (16)$$

$$= \frac{(K_u p_u + K_o p_o + K_e p_e)/(K_u + K_o + K_e)}{(K_u p_u + K_e p_e)/(K_u + K_e)}$$

$$= \frac{1 + \frac{K_o p_o}{K_u p_u + K_e p_e}}{1 + \frac{K_o}{K_u + K_e}}$$

$$< 1 + \frac{K_o p_o}{K_u p_u + K_e p_e}.$$

C is the capacity of cells 20 and 40 relative to the capacity of cell 20 in the absence of cell 40. $K_e p_e$ is the amount of power that is not eligible to be switched to the overlay carrier and the capacity C increases with decreasing $K_e P_e$. In the illustrative example, the number of calls $K_e$ assigned to the underlay carrier that are not overlay candidates depends on the spatial distribution and speed distribution of the K mobile terminals and if, for example, a majority of the K mobile terminals have a low speed and are located close to the base station 300 then the increase in capacity C due to the use of the overlay carrier will be large; however, if for example a majority of the K mobile terminals have a high speed away from base station 300 and are located far from base station 300 then the increase in capacity C will be smaller.

Similarly, the capacity C increases with increasing $K_o P_o$ which represents a total forward power carried on the overlay carrier. As such, to increase the capacity C the total power carried by the overlay is preferably large.

Figure 5:
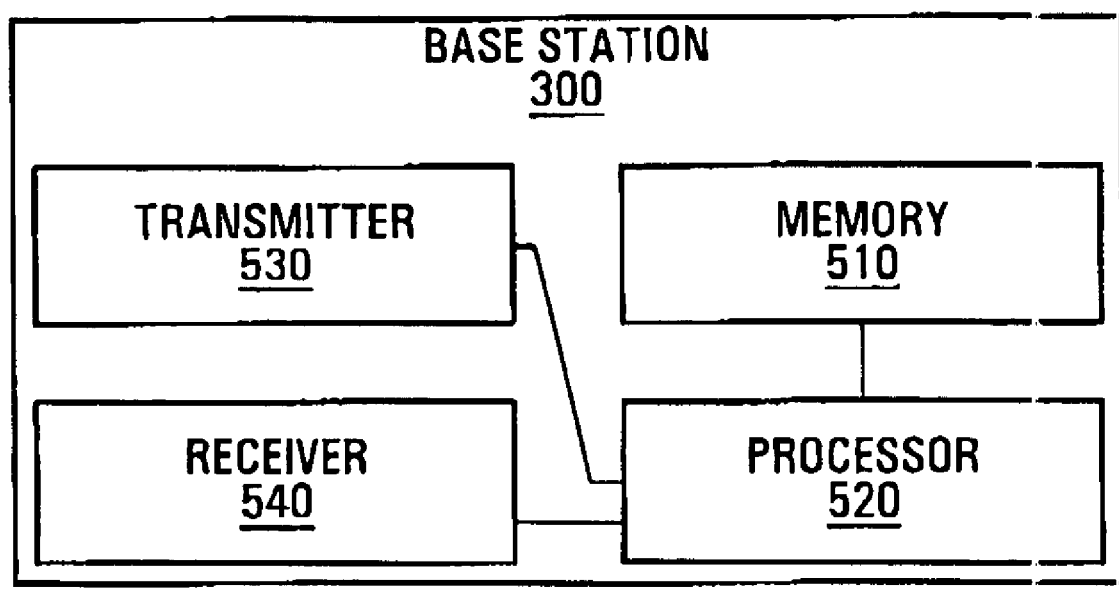
FIG. 5 is a block diagram of a base station of the cell of FIG. 3.

In the example implementation, the method of FIG. 2 is implemented at base station 300. In FIG. 5, the base station is shown in more details. In particular, the base station has a memory, 510, a processor 520, a transmitter 530, and a receiver 540. The memory 510 is adapted to store instructions for implementing the method of FIG. 2. In particular, with reference to FIG. 2 using the instructions the processor 520 is adapted to determine the resource parameter from information received using the receiver 540 and/or from information known directly within base station 300. The processor 520 also determines the mobility parameter from information received from the receiver 540 using the resource parameter and the mobility parameter. The processor 520 then determines which of the underlay carrier of cell 20 and the overlay carrier of cell 40 is to carry the traffic as a function of the resource parameter and the mobility parameter. The traffic is then carried on the carrier determined using the transmitter 530 or using the transmitter 530 and the receiver 540.

In the example implementation, the instructions for implementing the method of FIG. 2 are implemented at the base station 300; however, the invention is not limited to implementing the instructions at a base station. In other embodiments of the invention, the instructions are implemented at any suitable apparatus capable of implementing the instructions in any suitable way including software, hardware, or firmware for example.

Numerous modifications and variations of the present invention are possible in light of the above teachings. It is therefore to be understood that within the scope of the appended claims, the invention may be practiced otherwise than as specifically described herein.

The invention claimed is:

1. A method of determining which one of an underlay carrier and an overlay carrier is to carry traffic for a wireless call associated with a mobile terminal applied to each of K mobile terminals wherein K is an integer greater or equal to 1 and wherein for a mobile terminal k of the K mobile terminals where k is an integer satisfying k=1 . . . K, the method comprising:

determining a resource parameter associated with a resource for carrying the traffic;

determining a mobility parameter representing a mobility of the mobile terminals that is a function of/correlatable to a speed of the mobile terminal; and determining which of the underlay carrier and the overlay carrier is to carry the traffic as a function of the resource parameter and the mobility parameter, wherein determining which of the underlay carrier and the overlay carrier is to carry the traffic comprises using a transfer function $T_k$ to determine which of the underlay carrier and the overlay carrier traffic is to carry the traffic for a wireless call associated with the mobile terminal k, wherein when the wireless call associated with the mobile terminal k is assigned to the underlay carrier, the transfer function $T_k$ is given by:

$$T_k = \frac{p_{k,u}}{H_k},$$

$p_{k,u}$ being a forward power on the underlay carrier for the call associated with the mobile terminal k and $H_k$ being a probability that the mobile terminal k will require a hard hand-off within a predetermined time, and wherein wherein the wireless call associated with the mobile terminal k is assigned to the overlay carrier, the transfer function is given by:

$$T_k = \frac{p_{k,o}}{H_k}$$

$p_{k,o}$ being forward power on the overlay carrier for the wireless call associated with the mobile terminal k.

2. A method according to claim 1, wherein determining which of the underlay carrier and the overlay carrier is to carry the traffic as a function of the resource parameter and the mobility parameter is done as a function of hard hand-off history information, the hard hand-off history information reflecting a probability of hard hand-off as a function of the mobility parameter, the method further comprising maintaining the hard hand-off history information.

3. A method according to claim 2 wherein determining which of the underlay carrier and the overlay carrier is to carry the traffic as a function of the resource parameter and the mobility parameter is done as a function of hard hand-off history information for a current time frame, the method further comprising maintaining hard hand-off history information for a plurality of time frames, the hard hand-off history reflecting a probability of hard hand-off during each time frame as a function of the mobility parameter.

4. A method according to claim 1 wherein the determining which of the underlay carrier and the overlay carrier is to carry the traffic comprises:

when the wireless call is assigned to the underlay carrier, re-assigning the wireless call to the overlay carrier if the transfer function has a value within a first range of values; and when the wireless call is assigned to the overlay carrier, re-assigning the wireless call to the underlay carrier if the transfer function has a value within a second range of values.

5. A method of determining which one of an underlay carrier and an overlay carrier is to carry traffic for a wireless call associated with a mobile terminal, the method comprising:

determining a resource parameter associated with a resource for carrying the traffic;

determining a mobility parameter representing a mobility of the mobile terminal that is a function of/correlatable to a speed of the mobile terminal; and determining which of the underlay carrier and the overlay carrier is to carry the traffic as a function of the resource parameter and the mobility parameter, wherein:

the determining which of the underlay carrier and the overlay carrier carrier is to carry the traffic comprises:

calculating a transfer function as a function of the resource parameter, the mobility parameter, and hard hand-off history information;

when the wireless call is assigned to the underlay carrier, re-assigning the wireless call to the overlay carrier if the transfer function has a value within a first range of values; and when the wireless call is assigned to the overlay carrier, re-assigning the wireless call to the underlay carrier if the transfer function has a value within a second range of values; and the resource parameter is a function of a forward power for at least one of the carriers and the transfer function is a function of a ratio of the forward power and a probability of hard hand-off.

6. A method according to claim 5 wherein the overlay carrier is an isolated overlay carrier.

7. A method according to claim 5 wherein the resource parameter is an increasing function of at least one of a forward power, a schedule time, a number of Walsh codes that the mobile terminal occupies, and a delay in transmission.

8. A method according to claim 5 wherein the mobility parameter is correlatable with a likelihood of hand-off.

9. A method according to claim 8 wherein the mobility parameter is a function of/correlatable to at least one of:

a) a location, distance, and a non-radial speed in combination with a direction of travel of the mobile terminal, wherein the speed of the mobile terminal is the non-radial speed; and b) a radial speed, wherein the speed of the terminal is the radial speed.

10. A method according to claim 5 further comprising maintaining hard hand-off history information for a plurality of time frames.

11. A method according to claim 5 adapted for use with at least two underlay carriers and/or at least two overlay carriers.

12. A method according to claim 11 further comprising:

transmitting traffic on the one of the underlay carrier and the overlay carrier determined and/or receiving traffic on any carrier, time slot or channel associated by duplexing to the one of the underlay carrier and the overlay carrier.

13. The method of claim 5 comprising:

at each of a first plurality of base stations, providing wireless access using the underlay carrier and the overlay carrier;

at each of a second plurality of base stations, providing wireless access using only the underlay carrier;

for a particular base station of the first plurality of base stations, performing said steps of:

determining a resource parameter associated with a resource for carrying the traffic;

determining a mobility parameter representing a mobility of the mobile terminal; and determining which of the underlay carrier and the overlay carrier is to carry the traffic as a function of the resource parameter and the mobility parameter.

14. An apparatus for carrying traffic for a wireless call associated with a mobile terminal, the apparatus comprising:

a memory for storing instructions;

a processor adapted to, using the instructions;

i) determine a resource parameter associated with a resource for carrying the traffic;

ii) determine a mobility parameter representing a mobility of the mobile terminal that is a function of/correlatable to a seed of the mobile terminal; and iii) determine which one of an underlay carrier and an overlay carrier is to carry the traffic as a function of the resource parameter and the mobility parameter; and a transmitter adapted to transmit the traffic on any one of the underlay carrier and the overlay carrier determined and/or a receiver adapted to receive traffic on any carrier, time slot or channel associated by duplexing to the one of the underlay carrier and the overlay carrier, wherein a capacity to provide the resource for carrying the traffic increases with use of the overlay carrier.

15. An apparatus according to claim 14 wherein to determine which of the underlay carrier and the overlay carrier is to carry the traffic the processor is adapted to determine a transfer function that is a function of the resource parameter and the mobility parameter.

16. An apparatus according to claim 15 wherein to determine which of the underlay carrier and the overlay carrier is to carry the traffic, the processor is adapted to:

when the wireless call is assigned to the underlay carrier, re-assign the wireless call t the overlay carrier if the transfer function has a value within a first range of values; and when the wireless call is assigned to the overlay carrier, re-assign the wireless call to the underlay carrier if the transfer function has a value within a second range of values.

17. An apparatus according to claim 15 wherein to determine which one of the underlay carrier and the overlay carrier is to carry the traffic, the processor is adapted to:

calculate the transfer function as a function of the resource parameter, the mobility parameter, and hard hand-off history information;

when the wireless call is assigned to the underlay carrier, re-assign the wireless call to the overlay carrier if the transfer function has a value within a first range of values, the first range of values having a first limit defined by a first threshold; and when the wireless call is assigned to the overlay carrier, re-assign the wireless call to the underlay carrier if the transfer function has a value within a second range of values, the second range of values having a second limit defined by a second threshold.

18. An apparatus according to claim 15 wherein the processor is further adapted to:
  maintain hard hand-off history information allowing an estimate of a probability that the mobile terminal will require a hard hand-off within a predetermined time, the hard hand-off history information being maintained as a function of the mobility parameter; and
  use the probability to determine the transfer function.

19. An apparatus according to claim 18 wherein the resource parameter is a function of a forward power for at least one of the carriers and the transfer function is a function of a ratio of the forward power and the probability.

20. An apparatus according to claim 14 wherein the overlay carrier is an isolated overlay carrier.

21. An apparatus according to claim 14 wherein the resource parameter is a function of at least one of a forward power, a schedule time, a number of Walsh codes that the mobile terminal occupies, and a delay in transmission.

22. An apparatus according to claim 14 wherein the mobility parameter is a function of/correlatable to at least one of:
  a) a location, distance, and a non-radial speed in combination with a direction of travel of the mobile terminal, wherein the speed of the mobile terminal is the non-radial speed; and
  b) a radial speed, wherein the speed of the terminal is the radial speed.

23. An apparatus for carrying traffic for a wireless call associated with a mobile terminal, the apparatus comprising:
  a memory for storing instructions;
  a processor adapted to, using the instructions:
  i) determine a resource parameter associated with a resource for carrying the traffic;
  ii) determine a mobility parameter representing a mobility of the mobile terminal that is a function of/correlatable to a speed of the mobile terminal; and
  iii) determine which one of an underlay carrier and an overlay carrier is to carry the traffic as a function of the resource parameter and the mobility parameter; and
  a transmitter adapted to transmit the traffic on any one of the underlay carrier and the overlay carrier determined and/or a receiver adapted to receive traffic on any carrier, time slot or channel associated by duplexing to the one of the underlay carrier and the overlay carrier, wherein:
  to determine which of the underlay carrier and the overlay carrier is to carry the traffic the processor is adapted to determine a transfer function that is a function of the resource parameter and the mobility parameter;
  the processor is further adapted to:
  maintain hard hand-off history information allowing an estimate of a probability that the mobile terminal will require a hard hand-off within a predetermined time, the hard hand-off history information being maintained as a function of the mobility parameter; and
  use the probability to determine the transfer function;
  the resource parameter is a function of a forward power for at least one of the carriers and the transfer function is a function of a ration of the forward power and the probability; and
  the processor is adapted to determine a resource parameter associated with a resource for carrying the traffic, and to determine a mobility parameter representing a mobility of the mobile terminal, and to determine which of the underlay carrier and the overlay carrier is to carry the traffic as a function of the resource parameter and the mobility parameter for each of K mobile terminals wherein K is an integer greater or equal to 1.

24. An apparatus according to claim 23 wherein the processor is adapted to use a transfer function $T_k$ to determine which of the underlay carrier and the overlay carrier traffic from a wireless call associated with the mobile terminal k is to be carried on;
  wherein when the wireless call associated with the mobile terminal k is assigned to the underlay carrier, the transfer function $T_k$ is given by:

$$T_k = \frac{p_{k,u}}{H_k},$$

$p_{k,u}$ being a forward power on the underlay carrier for the call associated with the mobile terminal k and $H_k$ being a probability that the mobile terminal k will require a hard hand-off within a predetermined time; and
  wherein when the wireless call associated with the mobile terminal k is assigned to the overlay carrier, the transfer function is given by:

$$T_k = \frac{p_{k,o}}{H_k}$$

$p_{k,o}$ being a forward power on the overlay carrier for the wireless call associated with the mobile terminal k.

25. A base station comprising the apparatus of claim 23 and further comprising:
  a receiver adapted to receive information associated with the resource parameter and/or the mobility parameter.

26. A base station comprising the apparatus of claim 23 further adapted to collect information associated with the resource parameter from within the base station.

27. A computer readable medium having computer readable program code means embodied therein for determining which one of an underlay carrier and an overlay carrier is to carry traffic for a wireless call associated with a mobile terminal, the computer readable code means in said article of manufacture comprising:
  computer readable code means for determining a resource parameter associated with a resource for transmitting the traffic;
  computer readable code means for determining a mobility parameter representing a mobility of the mobile terminal that is a function of/correlatable to a speed of the mobile terminal; and
  computer readable code means for determining which of the underlay carrier and the overlay carrier is to carry the traffic as a function of the resource parameter and the mobility parameter, wherein:
  the computer readable code means for determining which of the underlay carrier and the overlay carrier is to carry the traffic comprises:
  computer readable code means for calculating a transfer function as a function of the resource parameter, the mobility parameter and hard hand-off history information;
  computer readable code means for when the wireless call is assigned to the underlay carrier, re-assigning the wireless call to the overlay carrier if the transfer function has a value within a first range of values; and
  computer readable code means for when the wireless call is assigned to the overlay carrier, re-assigning the wireless call to the underlay carrier if the transfer function has a value within a second range of values; and the resource parameter is a function of a forward power for at least one of the carriers and the transfer function is a function of a ration of the forward power and a probability of hard hand-off.

28. A method of determining which one of an underlay carrier and an overlay carrier is to carry traffic for a wireless call associated with a mobile terminal, the method comprising:

determining a resource parameter associated with a resource for carrying the traffic;

determining a mobility parameter representing a mobility of the mobile terminal that is a function of/correlatable to a speed of the mobile terminal; and determining which of the underlay carrier and the overlay carrier is to carry the traffic as a function of the resource parameter and the mobility parameter, wherein:

the determining which of the underlay carrier and the overlay carrier is to carry the traffic comprises:

calculating a transfer function as a function of the resource parameter, the mobility parameter, and hard hand-off history information;

where the wireless call is assigned to the underlay carrier, re-assigning the wireless call to the overlay carrier if the transfer function has a value within a first range of values; and when the wireless call is assigned to the overlay carrier, re-assigning the wireless call to the underlay carrier if the transfer function has a value within a second range of values; and the first range of values and the second range of values are selected to avoid rapid alternation between the underlay carrier and the overlay carrier.

\* \* \* \* \*

UNITED STATES PATENT AND TRADEMARK OFFICE
CERTIFICATE OF CORRECTION

PATENT NO.        : 7,349,699 B1
APPLICATION NO.   : 10/915384
DATED             : March 25, 2008
INVENTOR(S)       : Owen Kelly et al.

It is certified that error appears in the above-identified patent and that said Letters Patent is hereby corrected as shown below:

1) Column 10, equation (2) – "... k-1 ..." should be -- ... k=1 ... --;
2) Column 10, equation (3) – "... k-1 ..." should be -- ... k=1 ... --;
3) Column 10, equation (4) – "... X ..." should be -- ... K ... --;
4) Column 10, equation (4) – "... $w_k$ ..." should be -- ... $W_k$ ... -- (both instances);
5) Column 10, equation (5) – "... $w_k$ ..." should be -- ... $W_k$ ... -- (both instances);
6) Column 11, equation (8) – "... $KT_D$ ..." should be -- ... $KT_s$ ... --;
7) Column 11, equation (9) – "... $L_t$ ..." should be -- ... $L_c$ ... --;
8) Column 11, equation (9) – "... x ..." should be -- ... X ... --;
9) Column 12, equation (11) – "... $KT_k$ ..." should be -- ... $KT_s$ ... --;
10) Column 12, equation (12) – "... $KT_k$ ..." should be -- ... $KT_s$ ... --; (all three instances);
11) Column 12, line 60 (equation) – "... $KT_k$ ..." should be -- ... $KT_s$ ... --;
12) Column 13, line 5 (equation) – "... $KT_k$ ..." should be -- ... $KT_s$ ... --;
13) Column 13, line 15 (equation) – "... $KT_k$ ..." should be -- ... $KT_s$ ... --;
14) Column 18, claim 1, line 12 – "... terminals ..." should be -- ... terminal ... --;
15) Column 18, claim 1, line 37 – "... wherein ..." should be -- ... when ... --;
16) Column 20, claim 14, line 24 – "... seed ..." should be -- ... speed ... --;
17) Column 20, claim 16, line 45 – "... t ..." should be -- ... to ... --;
18) Column 21, claim 23, line 60 – "... ration ..." should be -- ... ratio ... --;
19) Column 22, claim 27, line 62 – "... for ..." should be -- ... for, ... --;
20) Column 22, claim 27, line 66 – "... for ..." should be -- ... for, ... --;
21) Column 23, claim 27, line 6 – "... ration ..." should be -- ... ratio ... --;
22) Column 24, claim 28, line 6 – "... where ..." should be -- ... when ... --;

Signed and Sealed this

Eighteenth Day of November, 2008

JON W. DUDAS
*Director of the United States Patent and Trademark Office*